July 20, 1954 — J. W. FAY — 2,684,161

MATERIAL COUNTING AND STACKING APPARATUS

Filed Feb. 17, 1950 — 4 Sheets-Sheet 1

INVENTOR.
Joseph W. Fay
BY Kegan and Kegan
Attys.

July 20, 1954 J. W. FAY 2,684,161
MATERIAL COUNTING AND STACKING APPARATUS
Filed Feb. 17, 1950 4 Sheets-Sheet 3

INVENTOR.
Joseph W. Fay
BY
Kegan and Kegan
Attys.

July 20, 1954  J. W. FAY  2,684,161
MATERIAL COUNTING AND STACKING APPARATUS
Filed Feb. 17, 1950  4 Sheets-Sheet 4
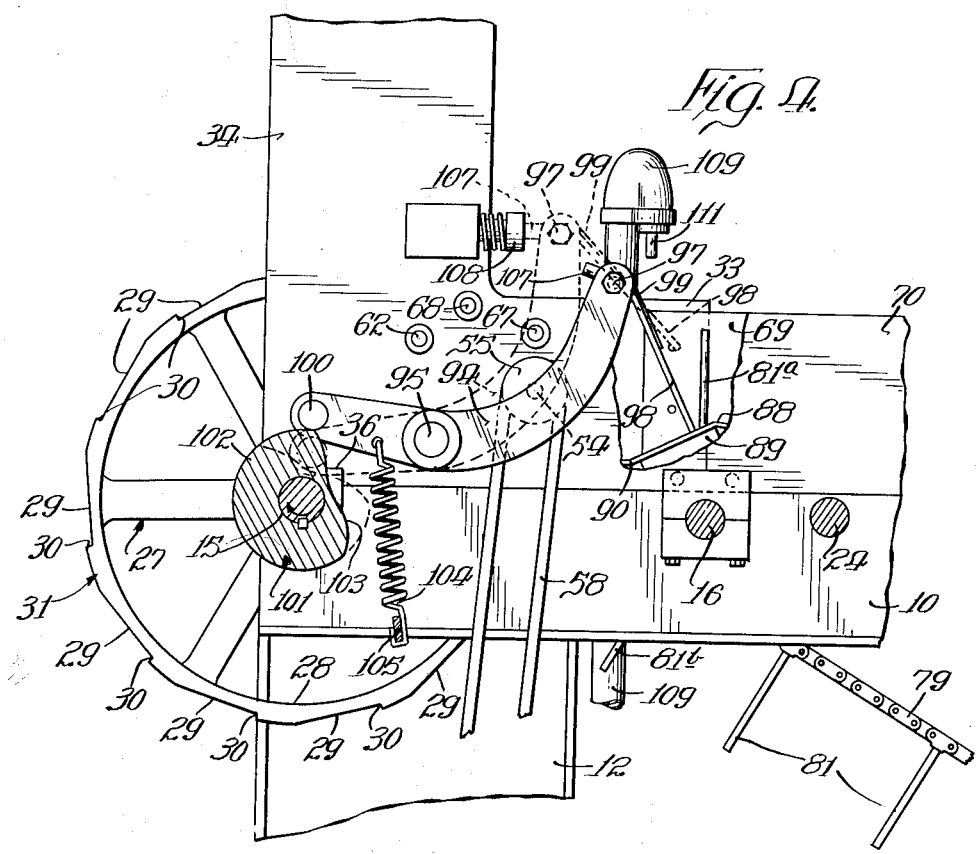
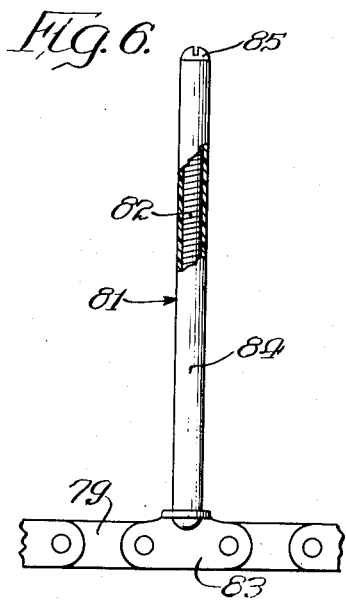
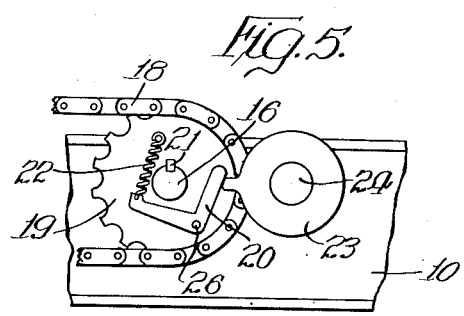
INVENTOR.
Joseph W. Fay
BY
Kegan and Kegan
Attys:

Patented July 20, 1954

2,684,161

UNITED STATES PATENT OFFICE 2,684,161

MATERIAL COUNTING AND STACKING APPARATUS

Joseph W. Fay, Villa Park, Ill., assignor to Schulze and Burch Biscuit Company, Chicago, Ill., a corporation of Illinois Application February 17, 1950, Serial No. 144,809

4 Claims. (Cl. 214—7)

My invention relates to apparatus for counting and stacking material which is in the form of tablets. More particularly, my invention relates to apparatus for segregating a quantity of comestibles such as soda crackers or graham crackers, into piles having a predetermined number of comestibles therein, and thereafter removing said piles of comestibles to a conveyor.

The principal object of my invention is to provide apparatus which counts and stacks material of the type indicated above at high speed, yet which is positive in its action so that each pile of material contains an identical number of tablets.

Another object of my invention is to provide apparatus which segregates loose comestibles such as soda crackers or graham crackers into piles suitable for packaging.

Another object of my invention is to provide apparatus which does not damage or crush comestibles as fragile as soda crackers, even though the apparatus is operated at high speed.

Another object of my invention is to provide apparatus which is of simple, rugged construction, and dependable in operation.

The foregoing objects are fully met by my invention, which in its broad aspect comprises means for stacking a supply of material in the form of tablets, a member movable relative to the stack of tablets in a recurring cycle, the stack of tablets being positioned so as to be in substantially constant contact with said member, means on said member for engaging and removing successively from the stack of tablets during each cycle of operation of said apparatus, a predetermined quantity of tablets, means for simultaneously receiving and stacking said selected tablets as they are discharged from said selecting means, and means for removing the stacked tablets at the end of each cycle of operation of the apparatus.

In order that my invention may be more fully disclosed, reference is had to the accompanying drawings which illustrate one form of apparatus embodying the foregoing and such other principles, advantages and capabilities as may be pointed out as this description proceeds, or as are inherent in the present invention. For purposes of clarity in exposition, the following description is explicit and the accompanying drawings are detailed, but it is distinctly to be understood that said exposition is illustrative only, and that my invention is not restricted to the particular details recited in the specification or shown in the drawings.

In the drawings:

Figure 4 is a fragmentary rear elevational view taken in section on the line 4—4 of Figure 1, the raised position of the gate member 98 being shown in dotted outline;

Figure 5 is a fragmentary rear elevational view taken in section on the line 5—5 of Figure 1;

Figure 6 is an enlarged detail in side elevation of a finger comprising a portion of the link belt drive of the embodiment shown; and Figure 7 is a fragmentary front elevational view taken on the line 7—7 of Figure 1.

Like reference characters designate like parts in the drawings and in the description of my invention which follows.

Figure 1:
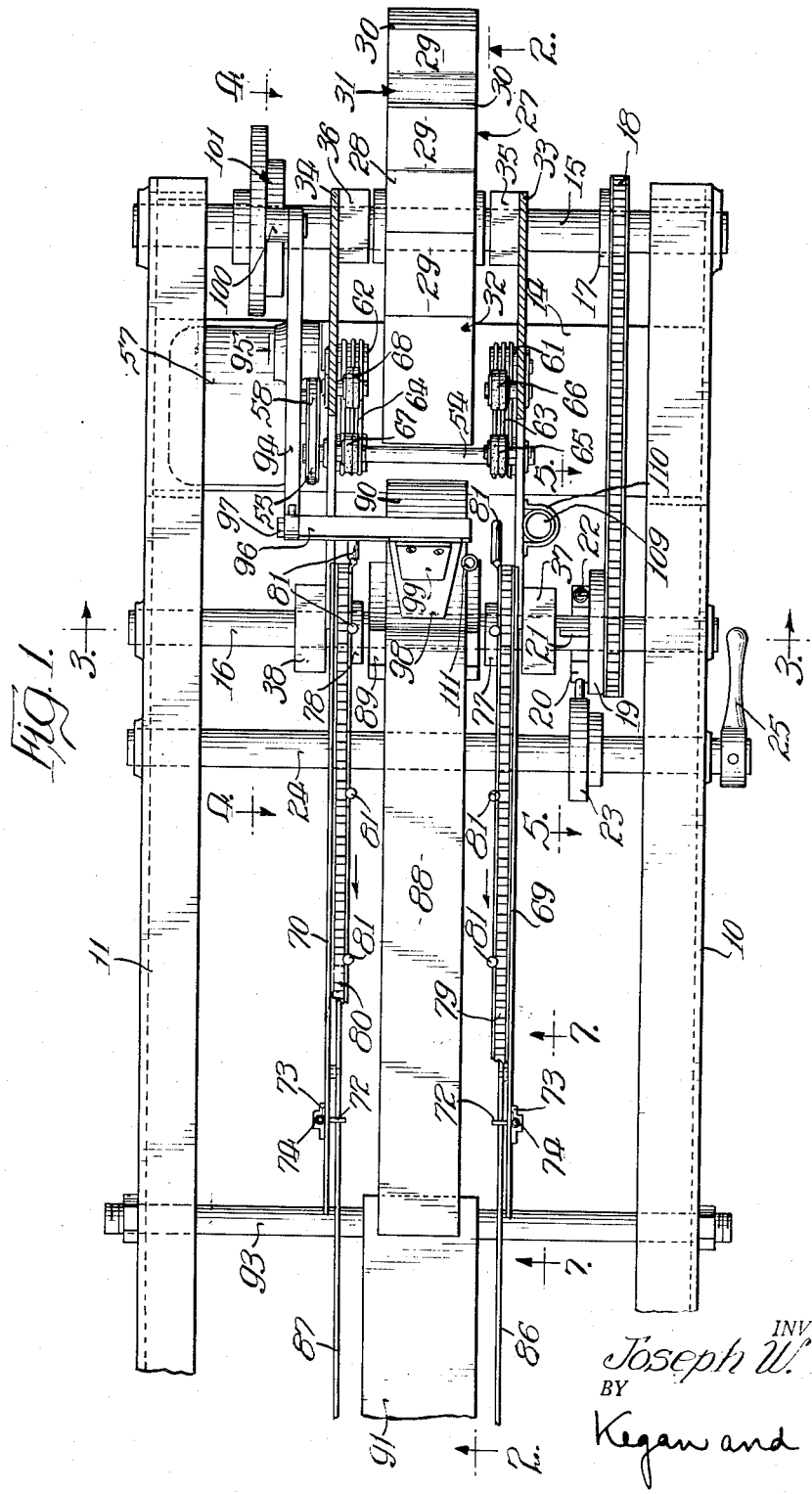
Figure 1 is a fragmentary plan view of material counting and stacking apparatus embodying my invention, said view being taken in section on the line 1—1 of Figure 2.
Figure 2:
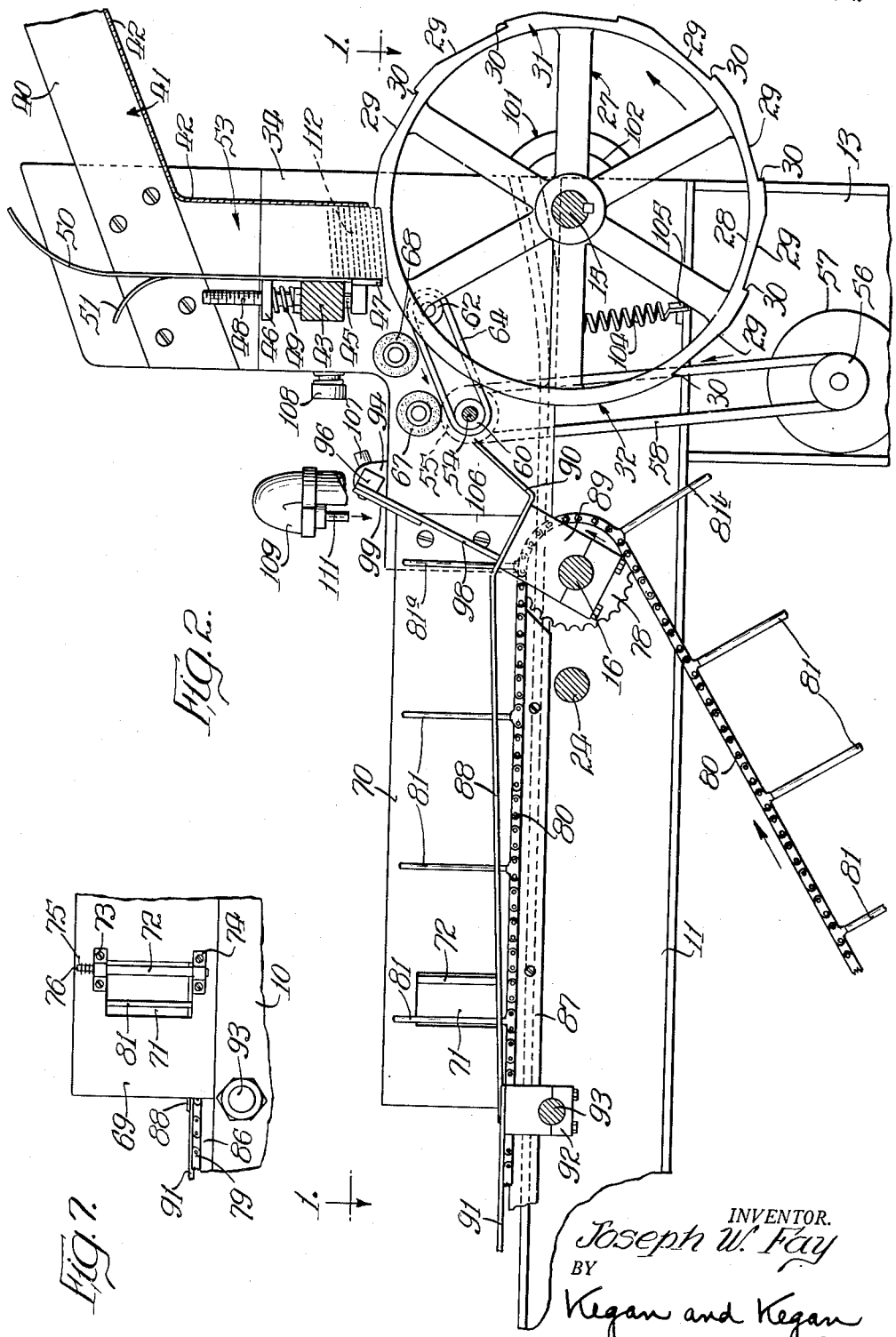
Figure 2 is a fragmentary front elevational view taken in section on the line 2—2 of Figure 1.

Referring now to the drawings, and more particularly to Figures 1 and 2 thereof, the device is shown as including a pair of side frames 10 and 11, uprights 12 and 13, and a cross brace 14. A rotatable shaft 15 extends between and is journaled by the side frames 10 and 11. Another rotatable shaft 16 is supported by the side frames 10 and 11 and is positioned substantially parallel to the shaft 15. The shafts 15 and 16 are interconnected by means of the sprocket 17, the flexible chain drive 18, and the sprocket 19, said sprocket 19 being drivably connected to the shaft 16 through the dog 20 and the drive lug 21 (Figure 5). The spring 22 acts to maintain the dog 20 normally in driving connection with the lug 21. By means of the clutch disc 23, which is mounted on the shaft 24 and positioned through the handle 25, the dog 20 may be pivoted about the pin 26 and disengaged from the drive lug 21.

As best shown in Figures 1 and 2, a selector wheel 27 is secured to the shaft 15 for rotation therewith. The rim 28 of the wheel is divided into a stepped portion 31 and a dwell portion 32. The stepped portion 31 includes a plurality (eight in the embodiment shown) of flats 29 and substantially radial shoulders 30 arranged in stepped configuration, while the surface of the dwell portion 32 is smooth and unbroken.

Positioned on opposite sides of the selector wheel 27 are two substantially L-shaped panels 33 and 34, said panels 33 and 34 being supported on the shaft 15 by the blocks 35 and 36, and on the shaft 16 by the blocks 37 and 38. The two sides 39 and 40 of a chute 41 of substantial U-shaped cross-section, are secured to the upper portions of the panels 33 and 34. The bottom plate 42 of the chute 41 is shaped to lie substantially radially of the shaft 15, and terminates just above the rim 28 of the wheel 27 (Figure 2).

A cross piece 43 extends between the panels 33 and 34, and acts as a guide for the two slide rods 44 and 45. The upper ends of the rods 44 and 45 are connected together by the strap 46. The lower ends of the rods 44 and 45 carry a plate 47. By adjusting the screw 48, the strap 46, which is spring loaded upwardly by the spring 49, may be moved either upwardly or downwardly, whereby the vertical distance between the plate 47 and the rim 28 of the wheel 27 may be adjusted. A center guide 50 and the two outer guides 51 and 52 are fastened to the cross piece 43 and extend upwardly therefrom to form with the plate 42 and the panels 33 and 34, a vertically disposed chute which is designated generally by the numeral 53.

Figure 3:
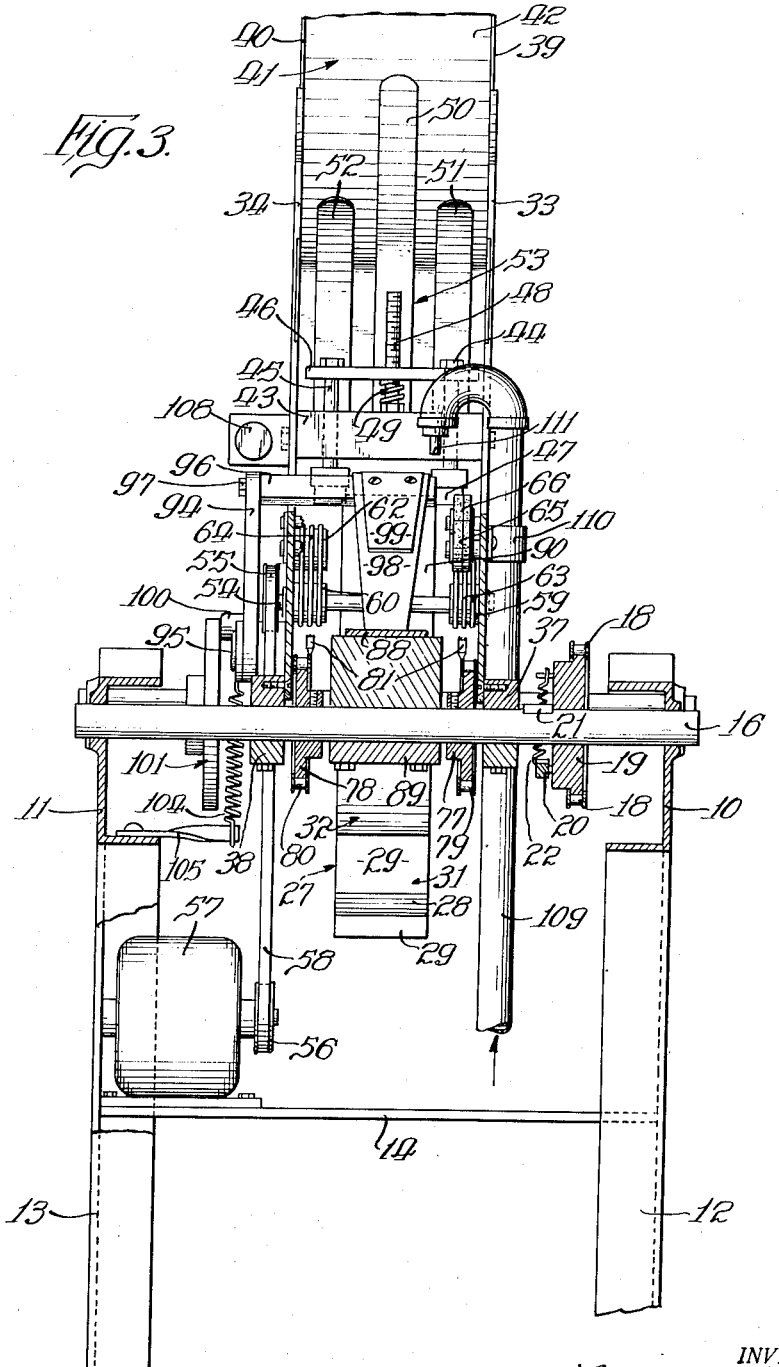
Figure 3 is a fragmentary side elevational view taken in section on the line 3—3 of Figure 1.

As best shown in Figures 1 and 3, a rotatable shaft 54 extends between the panels 33 and 34. A pulley 55 is secured to the outer end of the shaft 54, and is connected to the pulley 56 of the drive motor 57 by the endless belt 58. The drive motor 57 is secured to the cross brace 14. Two multi-grooved pulleys 59 and 60 are secured to the shaft 54 closely proximate to the panels 33 and 34, respectively. Two other multi-grooved pulleys 61 and 62 are rotatably secured to the panels 33 and 34, in the position shown in Figure 2. Endless, flexible belts 63 interconnect the pulleys 59 and 61, while similar flexible belts 64 interconnect the pulleys 60 and 62. Mounted above the belts 63, and secured to the panel 33, are two idler wheels 65 and 66, each of which has an outer rim of yieldable material such as foam rubber. Similar idler wheels 67 and 68 are positioned over the belts 64, and are rotatably secured to the panel 34.

As best shown in Figures 1 and 2, two side plates 69 and 70 extend lengthwise of the side frames 10 and 11, and are secured to the panels 33 and 34 respectively. Each of the side plates 69 and 70 includes an opening 71 through which an aligning flapper 72 extends. As shown in Figure 7, the flapper 72 is supported by the brackets 73, 74, while a spring 75 interconnects the flapper shaft 76 and the side plate 69 (or 70). The purpose and operation of the aligning flap 72 will become more apparent as this exposition proceeds.

Referring now to Figures 1 and 3, two sprockets 77 and 78 are secured to the shaft 16 closely adjacent to the inner sides of the side plates 69 and 70, respectively. Endless link belts 79 and 80 are looped about the sprockets 77 and 78, said belts 79 and 80 normally being drivably connected to other material handling mechanism. A plurality of fingers 81 are secured to the link belts 79 and 80, at regular intervals, as shown. Referring now to Figure 6, each of the fingers 81 includes a coil spring 82, one end of which is secured to the link 83. A flexible tube 84 surrounds the coil spring 82, and is held in place over said coil spring 82 by the fastener 85. To support the upper spans of the link belts 79 and 80, I provide two runners 86 and 87.

As best shown in Figures 1 and 2, a strip 88 is secured to the block 89, which block lies intermediate the sprockets 77 and 78 and is supported by the shaft 16. The end of the strip 88 nearest to the wheel 27 is shaped as a substantially L-shaped trough 90. The other end of the strip 88 rests upon a support member 91, which in turn is supported by the block 92 on the cross member 93.

Referring now to Figure 4, a bell crank 94 is rotatably mounted on the pivot pin 95 which extends from the panel 34. An arm 96 is secured to one end of the bell crank 94 by the fastener 97. A gate member 98, which may for example be a piece of fairly flexible rubber or plastic, extends from the arm 96, and is secured to said member 96 by the strap 99. The other end of the bell crank 94 includes a cam follower 100, which rides on the cam 101 keyed to the shaft 15. The cam 101 includes a rise portion 102, the subtending angle of which corresponds with the subtending angle of the step portion 31 of the wheel 27. The cam 101 also includes a dwell portion 103 which corresponds in angular displacement to the dwell portion 32 of the wheel 27. To make positive the action of the cam 101 and cam follower 100, I provide a spring 104 which is connected between the bell crank 94 and a bracket 105 extending from the side frame 10. When the cam follower 100 is in contact with the rise portion 102 of the cam 101, the gate member 98 is in the position shown in full line in Figure 4, in which case said member 98 forms with the L-shaped trough 90 a substantially U-shaped receptacle designated generally by the numeral 106. When the cam follower 100 contacts the dwell portion 103, however, the bell crank 94 turns on the pin 95 to raise the gate member 98 to the position shown in dotted outline in Figure 4. As the bell crank 94 revolves the gate member 98 to the raised position, the lug 107 contacts the spring loaded stop 108, to damp out acceleration forces growing out of the quick action of the cam 101.

Referring now to Figure 3, the device is shown as including a blower line 109 which is secured to the panel 33 by the strap 110, and which terminates in a nozzle 111 directed substantially downwardly into the U-shaped receptacle 106.

While it will be obvious to those skilled in the art that my apparatus may be used to count and to stack a wide variety of objects having a more or less uniform tablet shape, my invention has special application to the counting and stacking of loose, freshly baked crackers preparatory to their being packaged. Advantageously, modern baking equipment and techniques produce crackers of a highly uniform weight. Thus, the weight of a box of crackers can be accurately controlled within close limits by packaging a predetermined number of crackers therein. For example, eight graham crackers of a certain size and consistency, when selected at random, will weigh very close to one-quarter pound. Thus by segregating loose crackers into stacks each containing a predetermined number of crackers, the packaging of crackers in one quarter, one-half, and one pound packages, or in other desirable weight measures, is greatly facilitated.

My invention readily accomplishes this desirable end, as will be apparent upon consideration of the following description of one complete cycle of operation of the embodiment of the drawings, as applied to the counting and stacking of graham crackers. Referring to Figure 2, the freshly baked, loose crackers, designated by the numeral 112, are fed into the chute 41, and upon striking the guides 51 and 52, are deflected downwardly to lie within the chute 53 in stacked relation. When the link belts 79 and 80 are moving in the direction indicated, and the clutch mechanism of Figure 5 is in the operative position, the selector wheel 27 turns in a counterclockwise direction, as viewed in Figure 2. As each of the eight radial shoulders 30 of the stepped portion 31 moves beneath the stack of crackers 112, it selects and removes a cracker 112 from the chute 53. For each revolution of the wheel 27, therefore, a predetermined number of crackers 112 are selected and removed from the supply of crackers in the chute 53. In one commercial embodiment of my invention, the apparatus is constructed to handle graham crackers the dimensions of which are approximately 2½ inches by 5 inches by ¼ inch thick. In this exemplary device, the flats 29 of the wheel 27 are 2½ inches long, while the radial shoulders 30 are ⅛ inch high. Thus, as the wheel 27 turns, it acts in the nature of a sprocket wheel in which one side of each tooth is flat to receive and support momentarily a cracker while the other side is radially disposed to drive the cracker from the stack 112.

The plate 47 on the strap 46 is set to allow the passage of crackers therebeneath one at a time as the revolving wheel 27 selects and removes them from the stack of crackers 112 in the chute 53. As the crackers 112 fall free of the plate 47, they are picked up by the moving belts 63 and 64 and thereafter discharged into the U-shaped receptacle 106. To make positive the action of the belts 63 and 64, the idler wheels 65, 66, 67, 68 are positioned to exert a slight pressure against the moving crackers 112.

During the time in which the stepped portion 31 of the wheel 27 is moving beneath the chute 53, the rise portion 102 of the cam 101 contacts the cam follower 100, to hold the gate member 98 in the position shown in Figure 2. When the wheel 27 is in the position also shown in Figure 2, the fingers 81a, 81a, have just moved beyond the gate member 98, so that the receptacle 106 is open to receive the crackers 112. As the crackers 112 are discharged into the receptacle 106, they slide against the flexible gate member 98 and automatically stack themselves within said receptacle 106. The crackers leave the wheels 65 and 67 in a generally horizontal position, and at a velocity which insures that they stack in a neat pile within the receptacle 106. Since the wheel 27 selects eight crackers from the chute 53 during movement of the stepped portion 31 therebeneath, a total of eight crackers 112 is stacked in the receptacle 106 each time that the wheel 27 completes one revolution. Throughout the cycle of operation of the device, a stream of air is discharged from the nozzle 111, to exert a slight downward pressure on the crackers within the receptacle 106, to hold them in a compact pile. In practice, I have found that a nozzle discharge pressure of from four to six ounces is normally sufficient to prevent the crackers 112 from "floating" and to hold them compactly in the receptacle 106.

As the last flat 29 and shoulder 30 of the stepped portion 31 moves beneath the chute 53, the dwell portion 103 of the cam 101 commences to contact the cam follower 100. As this occurs, the bell crank 94 turns on the pin 95 to the position shown in dotted outline in Figure 4, to raise the gate member 98. When the wheel 27 is positioned so that the beginning of the dwell portion 30 is beneath the chute 53, the fingers 81b, 81b are substantially in alignment with the end of the strip 88. In the time during which the dwell portion 32 is moving beneath the chute 53, the sprockets 77 and 78 drive the link belts 79 and 80 to move the fingers 81b, 81b to the position of the fingers 81a, 81a in Figure 2. During this movement, the stack of crackers 112 within the receptacle 106 is engaged by the fingers 81b, 81b and moved out of said receptacle and along the strip 88. While the dwell portion 32 is beneath the crackers 112 in the chute 53, none of the crackers 112 therein are removed due to the smooth uninterrupted contour of said dwell portion 32. As the wheel 27 revolves back into the position shown in Figure 2, the cam 101 moves the bell crank 94 to return the gate member 98 to the "down," or closed position. Since the crackers within the receptacle 106 have been removed therefrom, the device is once again in readiness to remove a predetermined number of crackers 112 from the pile of crackers in the chute 53, and to stack them in the receptacle 106.

As the piles of crackers move along the strip 88, they successively contact the aligning flappers 72, 72 (Figure 1). The distance between the flappers 72, 72 is normally somewhat smaller than the lateral dimension of the piles of crackers. As each pile of crackers contacts the flappers 72, 72, they rotate slightly against the action of the spring 75, 75, but in so doing, act to align the crackers into a neat pile. Thus, as each pile of crackers moves on to the support member 91, it is stacked in proper alignment for packaging. Normally the packaging operation involves first wrapping each stack of crackers individually, and thereafter placing one, two or more wrapped stacks in a cardboard box. In practice, therefore, the member 91 and the link belts 79 and 80 usually are connected directly to wrapping machinery.

In the commercial embodiment of my invention above referred to, the selector wheel 27 turns at a speed of sixty revolutions per minute. Thus, the capacity of the machine is 3600 stacks of graham crackers each hour, each stack containing eight crackers of two segments each. In another embodiment of my invention, which is designed to handle and stack soda crackers 4 inches by 4½ inches by $\frac{7}{32}$ inch thick, the wheel 27 revolves fifty revolutions per minute. In this latter embodiment a total of eleven steps are placed in the wheel 27, so that the capacity of the machine is 3000 stacks, or 33,000 crackers each hour. Obviously the apparatus can be modified to count and stack other numbers of articles in each cycle of operation.

While the height of the radial shoulders 30 of the stepped portion 31 can be dimensioned to select two or more crackers 112 or other tablet shaped articles from the chute 53, in practice I find it desirable to select only one cracker 112 or other object at a time, since this results in a more positive control of the stacking which takes place in the receptacle 106. Similarly, I find it desirable, in the case of handling and stacking crackers and other comestibles, to limit the height of the radial shoulders 30 to approximately one-half the average thickness of said comestible, for the reason that the thickness of the comestible may vary appreciably. For example if the height of the radial shoulders 30 were the average thickness of a cracker 112, in selecting a cracker which is thinner than the average, the next succeeding cracker would be broken or damaged.

While the selecting means of my invention is shown as comprising a revolving wheel having steps in the periphery thereof, it will be apparent to those skilled in the art that other types of selecting means may be used, as long as during each cycle of operation a stepped, notched or similarly configured portion is moved relative to a stack of crackers or the like, and thereafter a dwell portion moves relative to said stack, to provide time for the removal of the selected articles from the receptacle 106 or its equivalent.

Having thus fully disclosed my novel material handling and stacking apparatus, and demonstrated its utility by reference to a specific embodiment thereof, I claim as my invention:

1. In apparatus for handling tablets such as soda crackers and graham crackers, the combination comprising: a chute having a discharge opening therein, means for feeding a supply of said tablets to said chute to form a stack in said chute above said discharge opening, a member movable relative to said discharge opening of said chute in a recurring cycle, in substantially continuous contact with the bottom of said stack, that portion of said member which contacts said stack of tablets including a plurality of stepped sections and a smoothly contoured dwell section between the last stepped section and the beginning stepped section, the length of each said stepped sections being at least as long as said tablet is in the direction in which said member is moving relative to said chute, the height of the steps between said stepped sections being approximately one-half the thickness of a tablet, whereby during each cycle of operation of said member said stepped sections remove from said stack of tablets in said chute a corresponding number of said tablets, means for conveying said tablets from said member, a receptacle positioned to receive said tablets from said conveying means in stacked relation, means for directing a stream of air against said tablets in said receptacle to hold said tablets in a compact pile, said receptacle including a gate portion, mechanism operating said gate portion, means actuating said mechanism to open said gate during the period when said dwell section contacts said tablets in said chute, and means for removing said tablets from said receptacle when said gate is open.

2. In apparatus for handling tablets such as crackers, the combination comprising: a selector wheel having a plurality of teeth in a portion and no teeth in another portion of the circumference thereof, each of said teeth having one side thereof substantially radial and of a height which approximates one-half the thickness of a tablet, the other side of said tooth being substantially flat and of a length equal to at least the length of a tablet, means for positioning a stack of tablets to bear against the circumference of said wheel, means for turning said wheel in a direction which brings said radial sides of said teeth successively into engagement with said stack of tablets, whereby during each revolution of said wheel said teeth remove from said stack a predetermined number of tablets, means for conveying said tablets from said wheel, a substantially U-shaped receptacle positioned to receive said tablets from said conveying means in stacked relation, said receptacle including a substantially L-shaped trough portion and a gate, mechanism for raising said gate, means actuating said mechanism when said other portion of the circumference of said wheel is in engagement with said stack of tablets, and means for removing the tablets from said receptacle each time said gate is actuated by said mechanism.

3. In cracker counting and stacking apparatus, the combination comprising: a chute having a discharge opening therein, means for feeding loose crackers to said chute to be in stacked relation above said discharge opening, a first shaft and a selector member mounted thereon for rotation relative to said discharge opening of said chute and in substantially constant engagement with the stack of crackers in said chute, that portion of said selector member which contacts said stack of crackers including a plurality of stepped sections and a smoothly contoured dwell section between the end stepped section and the beginning stepped section, the length of each of said stepped sections being at least as long as the dimension of a cracker in the direction in which said member moves past said chute, the height of the steps between said stepped sections being at least one-half the thickness of a cracker, whereby as said selector member moves relative to said chute a plurality of crackers are selected by said stepped sections and removed from said stack of crackers, a second shaft and a pair of rotatable drive members on said shaft, said drive members spaced apart a distance less than the width of a cracker, a strip positioned above and between said drive members and including a substantially L-shaped portion, a crank and a gate member moved by said crank, cam means on said first shaft for actuating said crank to move said gate member between a first and second position as said stepped sections and said dwell sections are respectively in contact with said stack of crackers, said gate member in said first position and said L-shaped portion comprising a receptacle for crackers, means for conveying crackers from said selector member to said receptacle, said receptacle positioned with respect to said conveying means to receive said crackers in stacked relation, said gate member in said second position being moved away from said strip to open said receptacle, and means driven by said drive members for removing said crackers from said receptacle when said gate member is in said second position.

4. In cracker counting and stacking apparatus, the combination comprising; a first shaft, a selector wheel on said shaft, a chute positioned over said wheel, means for stacking loose crackers within said chute over said wheel, means for rotating said shaft and said wheel normally in one direction, said wheel including a plurality of stepped sections spaced along a portion of the peripheral surface thereof, the length of each of said stepped sections being at least as long as the dimension of a cracker in the direction in which said wheel moves beneath said chute, each of said stepped sections terminating in a a radial shoulder the height of which approximates one-half the thickness of a cracker, the remaining portion of said peripheral surface of said wheel having a smooth, substantially arcuate configuration, whereby as said stepped sections successively move beneath and across said chute a corresponding number of crackers are selected and removed from said stack of crackers in said chute, said remaining portion of said peripheral surface of said wheel thereafter moving beneath said chute without removing any crackers therefrom, a second shaft spaced from and substantially parallel to said first shaft, a pair of drive sprockets on said shaft and spaced apart a distance less than the width of a cracker, a strip positioned above and intermediate said sprockets, and extending toward said wheel, the end of said strip upturned to form a stop, a pair of endless link belts looped about said pair of sprockets, pairs of fingers on said endless belts spaced apart a distance greater than the length of a cracker, drive means interconnecting said two shafts to bring a pair of said fingers substantially in alignment with said upturned end of said strip when said stepped portion of said wheel has moved just beyond said chute, a crank, a gate carried by said crank, a cam on said first shaft actuating said crank, said cam and crank positioning said gate substantially parallel to said upturned end of said strip when said stepped portion of said wheel is beneath said chute, said gate and said upturned end of said strip being spaced apart to receive crackers therebetween, and means conveying said selected crackers from said wheel to stack them successively onto said strip between said gate and said upturned end, said cam and crank raising said gate after said stepped portion of said wheel has moved beyond said chute, whereby said pair of fingers on said endless belts move the stacked crackers along said strip.

References Cited in the file of this patent

UNITED STATES PATENTS

| Number | Name | Date |
|---|---|---|
| 1,217,372 | Vincent | Feb. 27, 1917 |
| 1,350,755 | Vincent | Aug. 24, 1920 |
| 1,649,563 | Boettcher | Nov. 15, 1927 |
| 1,701,760 | Paffen | Feb. 12, 1929 |
| 1,886,378 | Dearsley | Nov. 8, 1932 |
| 2,109,050 | Quick | Feb. 22, 1938 |
| 2,318,132 | Welk | May 4, 1943 |
| 2,496,438 | Brandt | Feb. 7, 1950 |